United States Patent
Bigley

(10) Patent No.: US 6,947,371 B2
(45) Date of Patent: Sep. 20, 2005

(54) SECURE OPTICAL INFORMATION DISC

(75) Inventor: Joel Douglas Bigley, Cabot, AR (US)

(73) Assignee: Deluxe Media Services, Northbrook, IL (US)

( * ) Notice: Subject to any disclaimer, the term of this patent is extended or adjusted under 35 U.S.C. 154(b) by 0 days.

(21) Appl. No.: 10/792,352

(22) Filed: Mar. 3, 2004

(65) Prior Publication Data

US 2004/0228262 A1 Nov. 18, 2004

Related U.S. Application Data

(60) Provisional application No. 60/455,284, filed on Mar. 17, 2003.

(51) Int. Cl.[7] ............................. G11B 7/24; G08B 13/14
(52) U.S. Cl. .................... 369/290; 369/273; 340/572.6; 340/572.8
(58) Field of Search ................................. 369/290, 273, 369/292, 135, 133; 340/572.1, 572.8, 572.6, 572.4, 572.3; 206/308.2

(56) References Cited

U.S. PATENT DOCUMENTS

| | | | |
|---|---|---|---|
| 5,012,380 A | * | 4/1991 | Harissis et al. ............. 360/135 |
| 5,347,508 A | | 9/1994 | Montbriand et al. |
| 5,699,047 A | | 12/1997 | Tsai et al. |
| 5,825,292 A | | 10/1998 | Tsai et al. |
| 5,939,985 A | | 8/1999 | Tsai et al. |
| 6,097,291 A | | 8/2000 | Tsai et al. |
| 6,137,413 A | | 10/2000 | Ryan, Jr. |
| 6,525,661 B2 | * | 2/2003 | Tsai ........................ 340/572.4 |
| 6,614,750 B2 | | 9/2003 | Weber et al. |
| 6,693,542 B2 | * | 2/2004 | Hasegawa ................ 340/572.8 |
| 6,806,842 B2 | | 10/2004 | King et al. |

OTHER PUBLICATIONS

U.S. Appl. No. 10/272,518, filed Oct. 16, 2002, Sellers et al.
U.S. Appl. No. 10/242,964, filed Sep. 13, 2002, Brollier.
International Search Report and Written Opinion of the International Searching Authority.
Corrected Written Opinion Of The International Searching Authority.

* cited by examiner

*Primary Examiner*—Ali Neyzari
(74) *Attorney, Agent, or Firm*—Leydig, Voit & Mayer, Ltd.

(57) ABSTRACT

A secure optical data disc comprising an electronic article surveillance tag embedded within a layered disc structure comprising first and second substrates is disclosed. The tag is placed within a non-readable zone (i.e., one that does not have data tracks) of the secure disc. Layer-wise, the tag is either sandwiched between the two substrates or alternatively embedded within one of the two substrates. In the case where the tag is sandwiched between first and second substrates, a bonding layer occupies a space radially outward from the tag. The bonding layer holds the first and second substrates together thereby forming the secure disc.

26 Claims, 9 Drawing Sheets

DVD DIMENSIONS

Single-Sided, Single Layer Disc

DVD-5

Single-Sided Double Layer Disc

Double-Sided Dual Layer Disc

Coil Geometry and Placement
(Within Clamping Area of Disc)

After Initial Molding/Bonding and Before Stripping

| For DVD 18 | DVD 9 Side "A" | DVD 9 Side "B" |
|---|---|---|
| Layer 0 | 0.55 mm Polycarbonate | 0.55 mm Polycarbonate |
| Partial Reflect Layer | Gold/Silver (10 microns) | Gold/Silver |
| Bonding Layer | Bonding Lacquer | Bonding Lacquer |
| 100% Reflect Layer | Aluminum | Aluminum |
| Layer 1 | 0.55 mm Acrylic Blank | 0.55 mm Acrylic Blank |

FIG. 4A

| For DVD 14 | DVD 9 Side "A" | DVD 5 Side "B" |
|---|---|---|
| Layer 0 | 0.55mm Polycarbonate | 0.55 Polycarbonate |
| 1st Reflect Layer | Gold/Silver (10 microns) | Aluminum |
| Bonding Layer | Bonding Lacquer | N/A |
| 2nd Reflect Layer | Aluminum | N/A |
| Layer 1 | 0.55 mm Acrylic | N/A |

FIG. 4B

After Stripping

| For DVD 18 | DVD 9 Side "A" | DVD 9 Side "B" |
| --- | --- | --- |
| Layer 0 | 0.55 mm Polycarbonate | 0.55 mm Polycarbonate |
| Partial Reflect Layer | Gold/Silver | Gold/Silver |
| Bonding Layer | Bonding Lacquer | Bonding Lacquer |
| 100% Reflect Layer | Aluminum (Image of layer 1) | Aluminum |

FIG. 5A

| For DVD 14 | DVD 9 Side "A" | DVD 5 Side "B" (Not Stripped) |
| --- | --- | --- |
| Layer 0 | 0.55 mm Polycarbonate | 0.55 mm Polycarbonate |
| 1st Reflect Layer | Gold (partial reflect layer) | Aluminum |
| Bonding Layer | Bonding Lacquer | N/A |
| 2nd Reflect Layer | Aluminum (Image of layer 1) | N/A |

FIG. 5B

After Final Assembly

For DVD 18

| | |
|---|---|
| Layer 0 (disc A) | (2 layers readable from this side)<br>0.55 mm Polycarbonate |
| Partial Reflect Layer (disc A) | Gold/Silver |
| 1$^{st}$ Bonding Layer (disc A) | Bonding Lacquer |
| 100% Reflect Layer (disc A) | Aluminum (Image of layer 1) |
| Protective Coating | PC Lacquer |
| 2$^{nd}$ Bonding | Cationic Bonding |
| Protective Coating | PC Lacquer |
| 100% Reflect Layer (disc B) | Aluminum (Image of layer 1) |
| 1$^{st}$ Bonding Layer (disc B) | Bonding Lacquer |
| Partial Reflect Layer (disc B) | Gold/Silver |
| Layer 0 (disc B) | 0.55 mm Polycarbonate<br>(2 layers readable from this side) |

FIG. 6A

For DVD 14

| | |
|---|---|
| Layer 0 (disc A) | (2 layers readable from this side)<br>0.55 mm Polycarbonate |
| Partial Reflect Layer (disc A) | Gold/Silver |
| 1$^{st}$ Bonding Layer (disc A) | Bonding Lacquer |
| 100% Reflect Layer (disc A) | Aluminum (Image of layer 1) |
| Protective Coating | PC Lacquer |
| 2$^{nd}$ Bonding | Cationic Bonding |
| Protective Coating | PC Lacquer |
| 100% Reflect Layer (DVD 5) | Aluminum |
| Layer 0 (DVD 5) | 0.55 mm Polycarbonate<br>(1 layer readable from this side) |

FIG. 6B

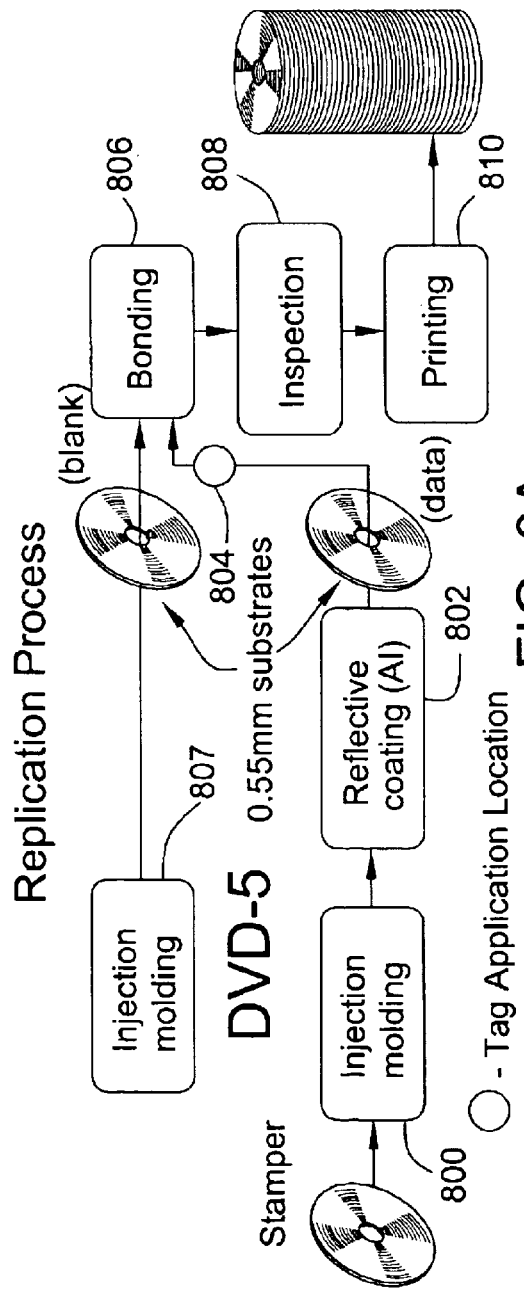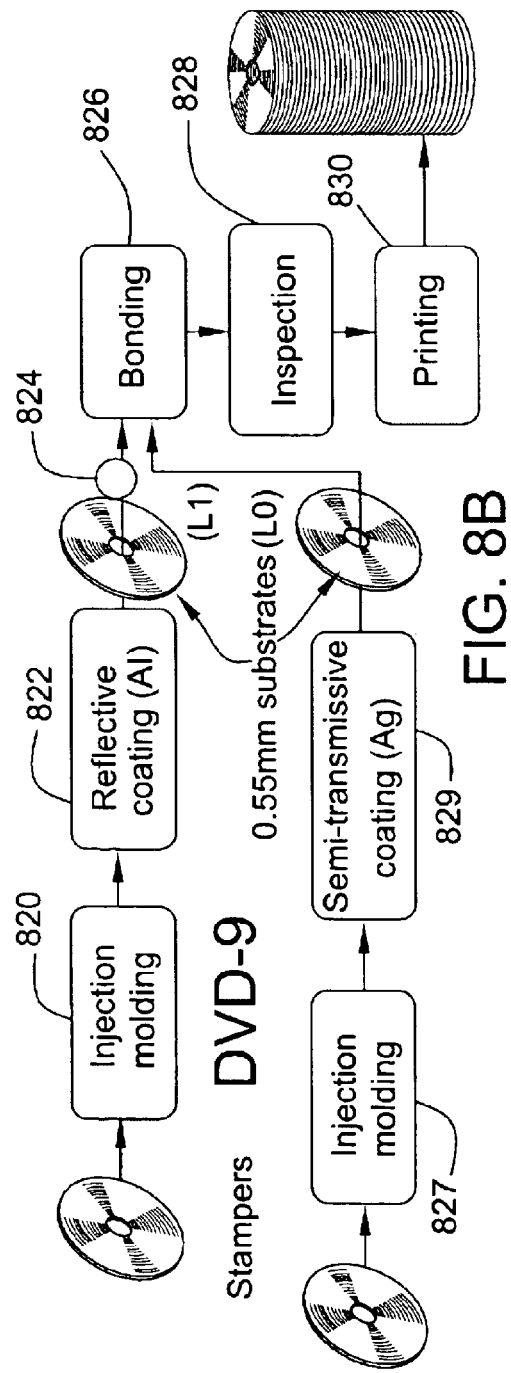

SECURE OPTICAL INFORMATION DISC

CROSS-REFERENCE TO RELATED APPLICATION

This application claims the priority benefit of Bigley, U.S. Provisional Patent Application Ser. No. 60/455,284, filed on Mar. 17, 2003, the contents of which are incorporated herein by reference in their entirety, including any references therein.

TECHNICAL FIELD

This invention generally relates to electronic data storage media such as those used to store music, movies, software (including games), and other valuable electronic data assets distributed through retail and/or rental outlets. More particularly, the invention relates to the manufacture of optical data storage discs for carrying an electronically detectable security tag. The security tag potentially embodies a variety of electronic article surveillance (EAS) technologies including ones that generate specific identification codes for inventory control (e.g., RFID and smart tags) as well as ones that, unless deactivated, resonate at a particular frequency (or range) and activate an alarm when passed through an electronic surveillance gate.

BACKGROUND

Optical data storage discs are the predominant media for storing music, movies and software (including general PC software as well video game software played upon game consoles connected to televisions/monitors) distributed via retail outlets. Today, music is encoded on an optical data storage disc using compact disc (CD) technology. Software that is distributed through retail outlets is also typically stored on optical data storage discs embodying the CD technology. Movies and games (executed on game consoles) are encoded on optical data storage discs using digital versatile disc (DVD) technology that holds significantly more data than a CD.

Retail theft of optical data storage discs storing valuable digital data assets has received considerable attention from retailers. Initially, theft was deterred through the use of bulky, six by 12 inch cardboard boxes that were difficult for shoplifters to conceal. Later, equally bulky, plastic frames were placed around the boxes to deter theft. While such packaging was an effective deterrent, it created substantial solid waste. Thus, the bulky boxes were abandoned and today, CDs are generally packaged in the well-known "jewel" case. Similarly, DVDs for movies are generally displayed for retail customers within slightly larger plastic cases including one or more optical data storage discs. On the other hand, retailers have resorted to placing DVDs containing game console software in locked cabinets to deter theft.

In the 1990s electronic security mechanisms replaced bulky packaging as a means for discouraging/controlling retail theft. In particular, electronic surveillance tags are now placed on/within optical disc storage retail packaging. Unless deactivated at the checkout counter, the security tags are sensed by surveillance panels positioned at the entrance/exit of a retail establishment. If not deactivated, sensors within the panels detect the security tag when a person attempts to leave with the case containing the security tag and an alarm is activated. A number of such security tag technologies are well known in the art.

Currently electronic security tags are attached to a case within which a DVD, for a movie or game, is held. If the case is taken from a retail establishment before the security tag is deactivated, then an alarm sounds when the security tag passes through security panels at the door. A shortcoming of attaching security tags to a package/case containing an optical disc is that a shoplifter need only remove the disc from the package (or remove the security tag from the package) to evade detection by security panels placed at a store's exit. As a consequence, retailers continue to maintain their game software within locked cases.

Alternatively, and apparently to address the shortcomings of attaching a security tag to a CD case, attaching a security tag to a CD disc having a single substrate has been proposed a number of times in the prior art. These previous proposed CD structures have yet to be adopted commercially by retailers. Introducing a security tag introduces the possibility that the security tag will interfere with playing the disc by a purchaser of the disc. One problem arising from attaching a security device directly to a disc is the need to maintain balance. Another restriction is that incorporating a security tag onto the disc itself should not cause the disc to no longer meet specified space/dimension standards for the particular optical data storage media.

SUMMARY OF THE INVENTION

The present invention is directed to a secure disc arrangement and method for manufacturing the secure disc such that a resulting optical disc is produced in a manner conforming to the space limitations of the optical disc media standards organizations as well as meeting the production throughput timing requirements of manufacturers—thereby providing both a technological as well as commercially acceptable solution to a need to control theft of movies, programs and games stored upon optically encoded media (e.g., DVDs) comprising two substrates that are produced/provided via two distinct production lines.

The present invention thus comprises a secure optical data storage disc. The secure disc includes a first substrate that is separate and distinct from a second substrate. The substrates, by way of example, are formed by injecting molten plastic within a mold. The secure disc has a non-readable zone that does not include data tracks (disposed upon a readable surface of the disc). A security tag is disposed within the non-readable zone of the disc and thus does not interfere with reading the data tracks. The format and layering of the data tracks differs in accordance with various embodiments of the invention.

The present invention also comprises a method for manufacturing a secure optical data storage disc that includes a first substrate, a second substrate, and a non-readable zone that is not occupied by data tracks. The method comprises initially forming the first substrate and the second substrate in any of a variety of ways. In embodiments of the invention, a pattern is embossed upon at least one of the substrates. The embossed substrate is thereafter covered by a thin reflective layer (or semi-transmissive layer in the case of an outer layer of a dual readable-layer side). In accordance with the present invention a security tag is secured to one of the first or second substrates within the non-readable zone. In an embodiment of the invention, the tag is placed upon one of the substrates prior to bonding the two halves together. However, in an alternative embodiment the tag is embedded within one of the two substrates during an injection molding stage that produces the substrate. The secure disc, with its encased security tag, is formed by bonding the first substrate and second substrate together such that the security tag is positioned between the first and second substrates.

The present invention is intended to encompass a variety of optically encoded discs carrying a variety of information assets within a reflective/semi-transmissive layer carried between two substrates. The invention is embodied, for example, within DVDs that are encoded with movies, videogame console game software, and software in general. Such embedding prevents separation of a disc from its EAS tag and as such provides a significantly higher barrier to circumvention by would be shoplifters than other known arrangements that merely embed the tag within a case. The present invention is intended to be carried out through the use of a variety of thin film EAS technologies arranged in a variety of topologies and circuits. The invention will be described, by way of illustrative examples, further herein below.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4a–4b are DVD layer summaries for an initial molding stage for DVD-14 and DVD-18 formats;

FIGS. 5a–5b are DVD layer summaries for an intermediate (stripped) stage for DVD-14 and DVD-18 formats;

FIGS. 6a–6b are DVD layer summaries for a final assembly stage for DVD-14 and DVD-18 formats;

FIGS. 8a–8b summarizes exemplary fabrication stages for DVD-5 and DVD-9 discs comprising security tags embedded between two substrates.

DETAILED DESCRIPTION OF THE DRAWINGS

A secure disc, including all formats (e.g., CD, DVD, etc.), comprises a security tag sandwiched between first and second substrates of the secure disc. At least an antenna portion of the security tag occupies a region of the disc that is not encoded with optically sensed data. The location of the security tag avoids interfering with optically sensed data stored upon the secure disc. In exemplary embodiments, the security tag is sandwiched between first and second substrates at a location near the hub of the secure disc (e.g., within a clamping region, and potentially extending into a mirror band area).

Furthermore, the security tag is substantially balanced with regard to a rotational axis of the secure disc. In an embodiment of the invention the security tag is ring-shaped (i.e., defined by concentric circular inner and outer edges). Thus, when concentrically embedded/sandwiched between two substrates of the secure disc, the thin film security tag neither unbalances the disc nor interferes with data acquisition from the disc.

The present invention contemplates a variety of thin film EAS sensor technologies/topologies. In particular embodiments of the invention, the security tag is provided in the form of an insulated thin film resonating device including capacitively coupled coiled circuits, carried by an insulating thin film, constituting an inductor/capacitor (LC), or resonant, circuit. The insulating thin film establishes the capacitive aspect of the LC circuit by slightly offsetting pairs of metallic coils that make up the security tag. The paired coils of the security tag have sufficient surface area to resonate when exposed to electromagnetic energy at a frequency within a particular frequency range. Alternatively, a separate capacitor circuit, separate from the metallic coils, provides at least a portion of the capacitive aspect of the security tag. The signal generated by the security tag sandwiched between the two substrates of an optical data storage disc is detected by a receiving antenna thereby making it a viable electronic article surveillance anti-theft device capable of discouraging theft of the optical data storage disc.

Figure 1:
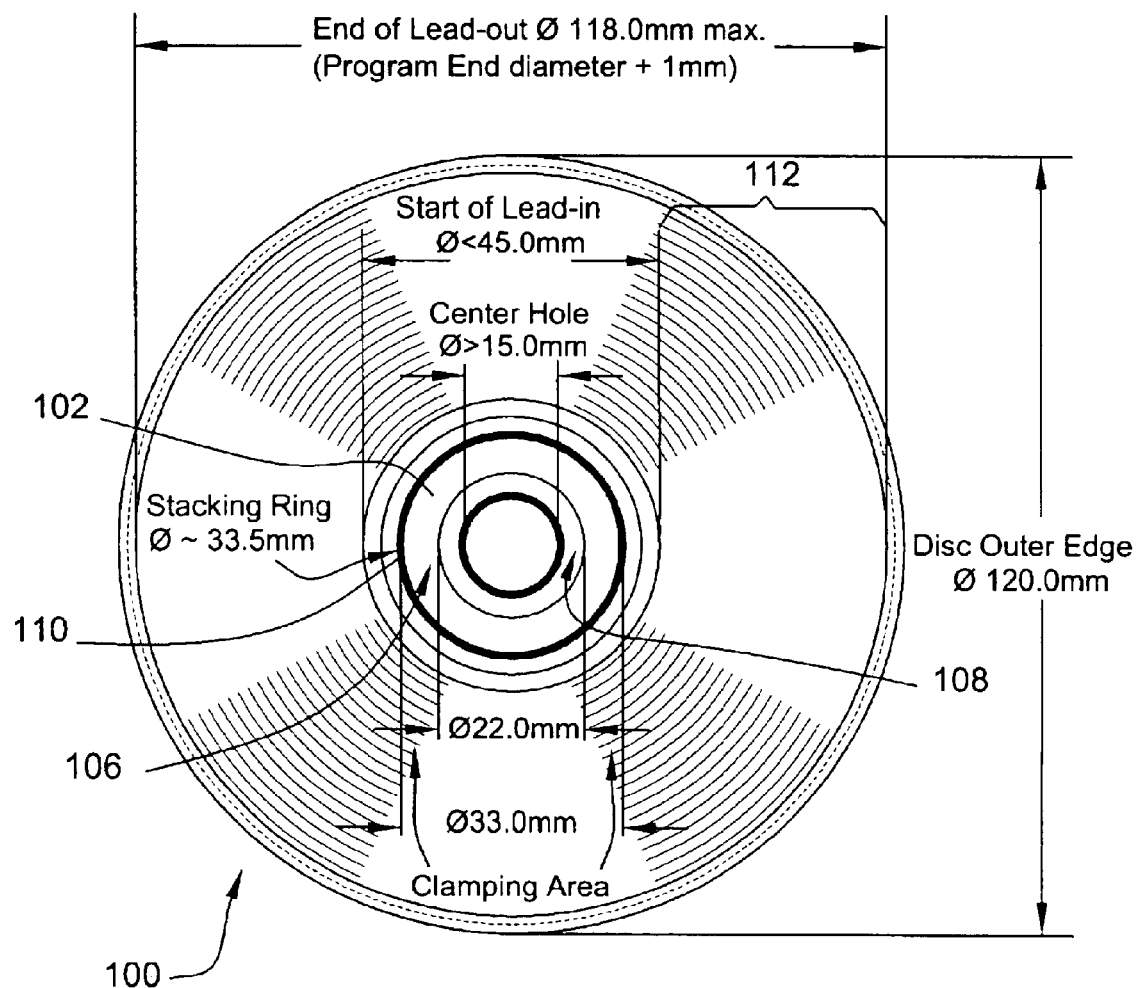
FIG. 1 is a schematic plan view of an exemplary secure disc comprising an annular security tag sandwiched between two substrates of an optical disc and located within the non-data region of disc.

Turning to the drawings, and in particular FIG. 1, the invention is presented in the form of a secure optical data storage disc 100 (also referred to herein as "secure disc 100") that comprises a security tag 102 sandwiched/embedded between a first and second substrate. In general, the tag occupies a non-readable surface area on the disc 100. In the illustrative embodiment, based upon DVD standard dimensions, the security tag 102 comprises a thin film LC resonating device that resides, by way of example, primarily within an annular clamping area 106 of the secure disc 100 (and centered with regard to the axis of rotation of the disc 100). The clamping area 106 is defined by a ring with an inner diameter of 22.0 mm and an outer radius of 33.0 mm.

The size/dimensions of the security tag 102 are generally bound by the requirement that it does not interfere with reading encoded data—and should not be shielded by a metal layer, and therefore at least the antenna portion of the security tag 102 occupies non-readable regions of the secure disc 100. Thus, in embodiments of the invention, at least a portion of the security tag 102 extends beyond the clamping area 106 to other regions of the disc 100. For example, in an embodiment of the invention the security tag extends into an annular portion 108 of the secure disc 100 having an inner diameter of 15.0 mm and outer diameter of 22.0 mm. However, the tag 102 does not extend over the rim of the center hole (at a radial distance of 15.0 mm. from the rotational axis of the disc 100). In this embodiment the security tag 102 occupies an area from 15.0 mm to 33.0 mm (just inside a stacking ring 110, if present, at a diameter of 33.5 mm) thereby enhancing the signal strength of the security tag.

Furthermore, to provide a stronger signal, in alternative embodiments of the invention, the outer edge of the surface area of the security tag 102 is potentially extended into a non-readable region just beyond the stacking ring 110 diameter (33.5 mm). This region is referred to as the "mirror band" region of the disc. On the other hand, in such alternative embodiments of the invention, the security tag 102 does not extend beyond the mirror-band region into a readable region 112 of the secure disc 100 so as to obscure readable data tracks that begin at a diameter of 45.0 mm and end at a diameter of 118 mm in the illustrative embodiment since the coil/antenna is not to be shielded by a metal layer. However, in embodiments of the invention, other circuit components of the security tag 102, such as a capacitor or diode, are hidden under a metal layer, such as the mirror band, to fully utilize available space to maximize the signal of the resonator.

The mirror band region contains information that is visually or electronically scanned to provide information. In the case of a DVD with two content-laden substrates, two barcodes are provided. The barcodes are offset so that the reader can access both barcodes from one side of the disc. Due to the alignment of the stamper on the replicator, open spaces exist on the mirror band. In embodiments of the invention, the open spaces are occupied by portions of the security tag 102 such as a capacitor. In such cases, the mirror band is isolated from the portion of the metal layer constituting the data portion of the disc through double masking—i.e., a first mask is used to sputter the data tracks, and a second mask is used to sputter the mirror band. The second sputtering stage deposits a thicker layer of metal for the mirror thereby increasing its conductivity. The mirror band is thereafter used as a portion of the antenna for the security tag 102.

As will be evident to those skilled in the art, the above-described exemplary embodiment can be modified in a number of ways, including, without limitation modifying: any of the identified dimensions (including the disc itself), the size of the security tag 102, the type of encoding of data on the disc (e.g., CD, DVD, etc.), the type of information encoded/embodied in the security tag (e.g., an RFID tag providing a value corresponding to the particular disc—as opposed to merely resonating at a particular frequency to which a sensor is tuned), and the type of data on the data tracks of the disk (e.g., movies, games, application programs, music, etc.). Such modifications are intended to fall within the scope of the present invention.

Turning to FIGS. 2a–d, partial cross-sectional views are provided of four exemplary types of secure DVD discs 200a–d. These simplified cross-sectional views (corresponding to a side view of the secure disc 100, when quartered) depict the general location of a security tag 202 within the layers of exemplary secure disc structures. The security tag 202, by way of example, comprises a polypropylene or polyethylene/Mylar backing material imprinted with a metallic coil circuit. In an embodiment of the invention, the security tag 202 includes a capacitor device that is short-circuited during deactivation (at the checkout counter). Suitable manufacturers of such tags are All-Tag Security S.A. Z.A.E. of Belgium and Checkpoint Systems, Inc. of Thoroughfare, N.J.

In an embodiment of the present invention, the security tag 202 is embedded within any of a variety of DVDs conforming to the following dimensions. By way of example, each substrate is approximately 0.6 to 0.5 mm. (but may be thinner to accommodate multiple readable layers on a side), and a bonding layer 204, used to hold the two substrates (including their reflective/transmissive data layers) is approximately 0.10 mm. Therefore the total thickness of the DVD structure, regardless of readable data layer format, is approximately 1.20 mm. (+0.30 mm/–0.06 mm). The disc has an outer diameter of 120.00 mm (±0.30 mm), and the center hole has a diameter of 15.00 mm (+0.15 mm/–0.00 mm). The values in parentheses represent tolerances specified by the standard, ECMA-267 $3^{rd}$ Edition, April 2001, for 120 mm DVD read-only discs. The above-specified dimensions and tolerances are intended to be exemplary and differ in alternative embodiments of the invention.

In an embodiment of the invention, the security tag 202 is located/embedded within a space/layer of a secure disc referred to herein as the bonding/adhesive layer 204 having a thickness of approximately 0.10 mm. A suitable manufacturer of a bonding resin for the bonding/adhesive layer 204 is Nagase California Corp. of Sunnyvale, Calif. The bonding/adhesive layer 204 is sandwiched between first and second polycarbonate substrates 208x and 210x of a secure DVD disc. Suitable polycarbonate material is provided by Teijin Kasei America of Alpharetta, Ga. It is noted that in an embodiment of the invention, a tag is placed within a molding cavity prior to the injection of the polycarbonate. The polycarbonate flows over the tag and embeds the tag within the substrate half.

Figure 2A:
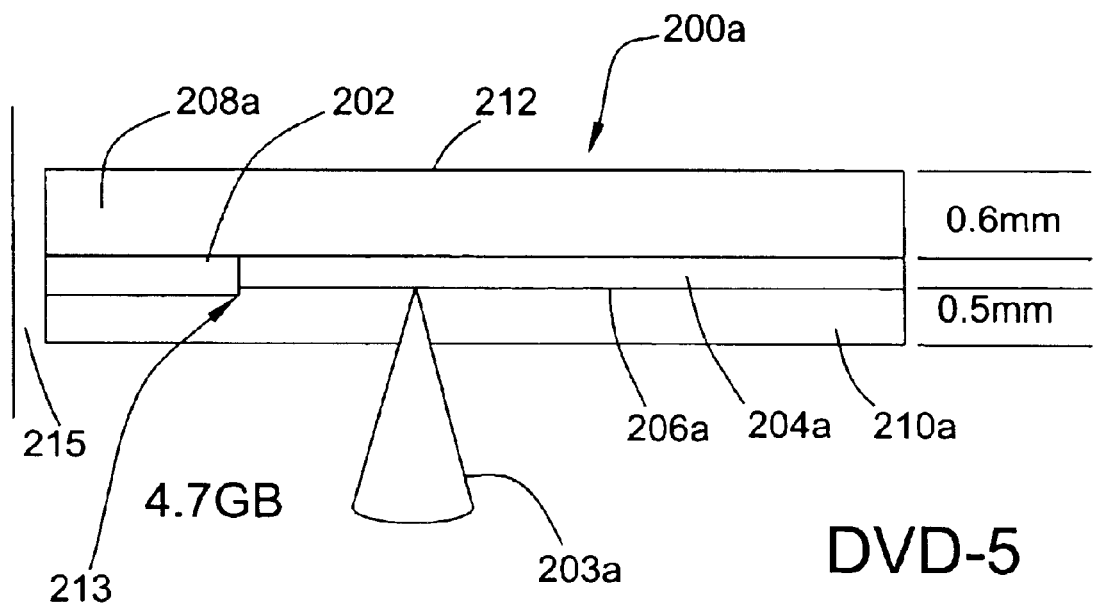
FIGS. 2a–2c are cross-sectional views of various types of secure DVD disc formats.
Figure 2B:
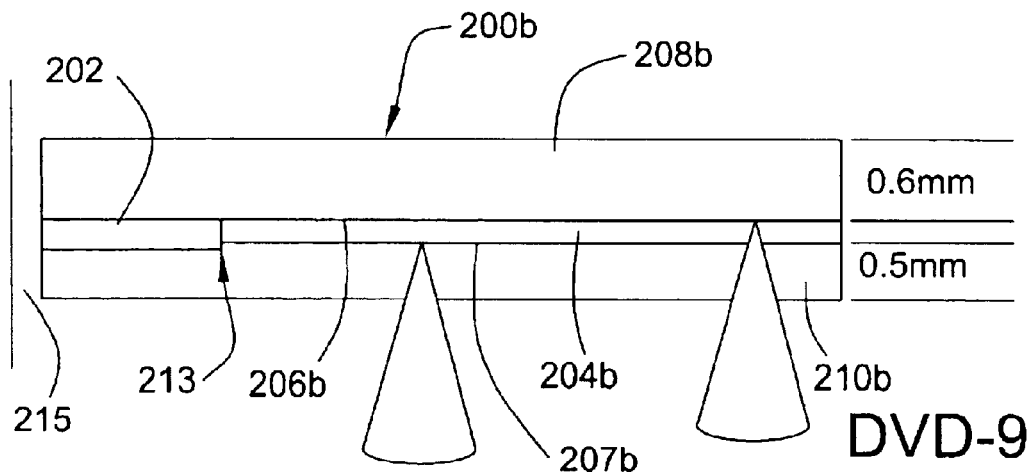
Figure 2C:
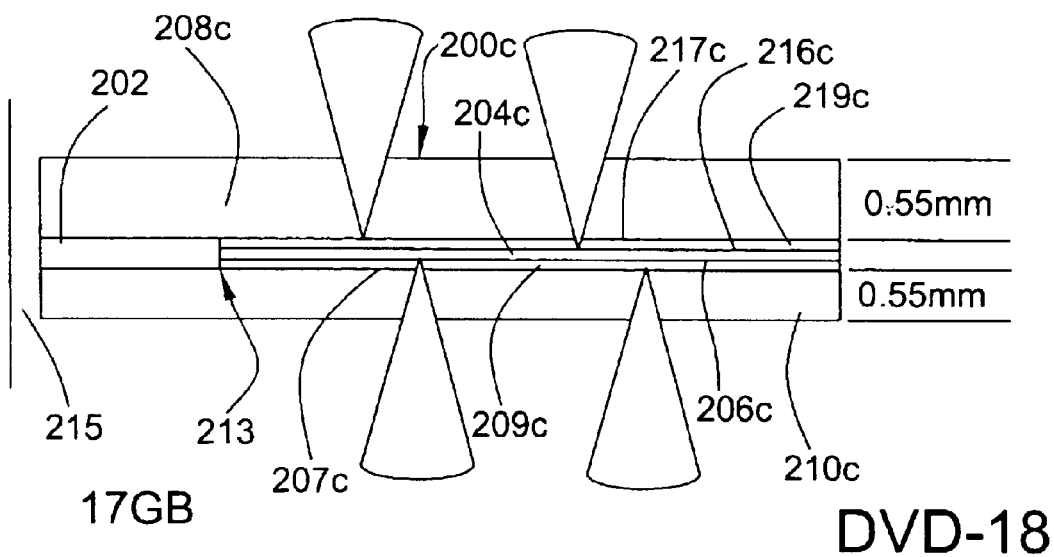

As demonstrated in the various embodiments of the secure disc depicted in FIGS. 2a-c, the substrates are either "blank" or alternatively carry one or more metalized/reflective layers depending upon the disc capacity. It is noted that in illustrative embodiments of the invention at least one of the substrates 208x and 210x is potentially "thinner" near the center hole. This accommodates a portion of the security tag 202's thickness (approximately 0.02 mm) that exceeds the thickness of the bonding/adhesive layer 204x. In embodiments of the invention, the two substrates are separately processed, and at a point just prior to bonding the two substrates 208x and 210x together, the security tag 202 is placed upon one of the two substrates. Thereafter, the two substrates are bonded together using any appropriate bonding/adhesive material which forms the bonding/adhesive layer 204x. It is noted that the views depicted in FIGS. 2a–c are not to scale, but are intended to show the general layers of various embodiments of a secure disc embodying the present invention.

FIG. 2a depicts a schematic cross-sectional view of a secure disc 200a referred to as a DVD-5 along with suggested/exemplary dimensions—that may vary in accordance with various embodiments of the invention. The DVD layers/format depicted in FIG. 2a is used for DVD's that carry a variety of encoded data including, by way of example, movies and game console-based video game software. The disc 200a generally depicts layered structures specified for a single-sided, single readable layer DVD-5 disc. In the illustrative example the DVD-5 disc 200a includes a single reflective layer 206a (approximately 10 microns thick) and is readable on one side (as indicated by a laser beam 203a). The security tag 202 (approximately 0.1 mm. thick) is sandwiched, along with a bonding/adhesive layer 204a (approximately 0.07 mm.), between a blank (dummy) substrate 208a (approximately 0.6 mm.) and a non-blank substrate 210a (approximately 0.5 mm.) upon which the single reflective layer 206a is deposited. It is specifically noted that the above layer thicknesses are provided for illustrative purposes and should not be construed as limiting the present invention. For example, modifications to the tag 202 thickness potentially influence the thickness of the substrate and bonding resin layers. The reflective layer 206a is, by way of example, aluminum. In embodiments of the invention the blank substrate 208a optionally includes printed artwork on its outer non-readable surface 212. Finally, it is noted that in the illustrative embodiments, the substrate 210a thins beginning at point 213 of a non-readable portion adjacent to a center hole 215. The width difference in substrate 210a (e.g., approximately 0.01 to 0.02 mm.) accommodates a difference in the thickness of the security tag 202 and the bonding/adhesive layer 204. While not specifically depicted in FIG. 2a, the tag 202 is bonded to one, or both, of the substrates 208a and 210a with an adhesive (approximately 5 microns thick).

FIG. 2b depicts a schematic cross-sectional view of a secure disc 200b that incorporates the layered structures specified for a single-sided, dual readable layer DVD-9 disc. In the illustrative example the DVD-9 disc 200b includes a reflective layer 206b sputtered on a stamped substrate 208b, and a semi-transmissive layer 207b that is sputtered on a stamped substrate 210b. The semi-transmissive layer 207b is, by way of example, a very thin layer (e.g., 10 microns or less) of gold, silver, silver alloy or silicon. The security tag 202 occupies a layer of the DVD structure that is also occupied by a transparent bonding/adhesive layer 204b between the stamped substrate 208b which carries the reflective layer 206b, and the semi-transmissive layer 207b sputtered upon the substrate 210b. Methods for fabrication of the two readable layers on a single side of a DVD-9 disc are known to those skilled in the art. In exemplary embodiments of the invention, the reflective layer(s) are aluminum and the transmissive layer(s) are gold, silver, silver alloy, or silicon. The layer thicknesses for the DVD-9 structure are generally the same as the ones described above for FIG. 2a.

FIG. 2c depicts a schematic cross-sectional view of a secure disc 200c that incorporates the layered structures specified for a double-sided, dual readable layer DVD-18 disc. In the illustrative example the DVD-18 disc 200c includes on a first readable side: a reflective layer 206c, a transparent bonding layer 209c and a semi-transmissive layer 207c fabricated on/attached to substrate 210c. The second readable side includes: a reflective layer 216c, a transparent bonding layer 219c and a semi-transmissive layer 217c fabricated on/attached to substrate 208c. While not specifically depicted in FIG. 2c, protective layers (see FIG. 6a and FIG. 6b) are spin coated on their respective halves of the, disc 200c to protect the reflective metal layers. Thereafter, the secure tag 202 is placed upon one of the two halves of the DVD-18 corresponding to substrates 208c and 210c. Finally, the two halves are brought together to form a layered structure wherein the security tag 202 occupies a layer of the DVD structure that is also occupied by the bonding/adhesive layer 204c between the protective layers. In yet another embodiment, the security tag 202 is placed between substrate halves of a dual-readable side DVD-14 structure. It is noted that, in the illustrative embodiment, the thickness of the metal and bonding layers are sufficiently thick in the DVD-18 structure such that a change in substrate thickness is not needed at point 213. In other embodiments the thickness of one or more of the two substrates is thinned at a portion where the tag is placed to accommodate the tag thickness.

Figure 3D:
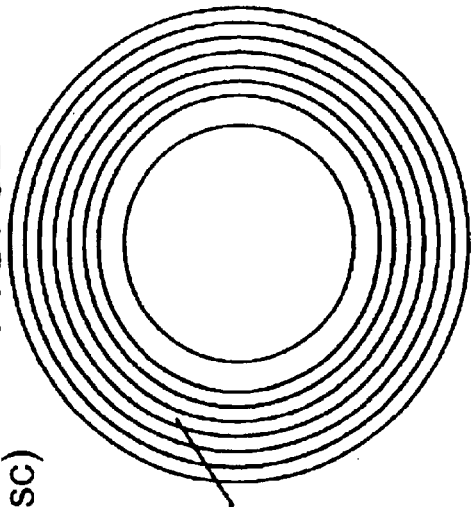
FIGS. 3a–d are a set of plan views of various security tag coil configurations.
Figure 3C:
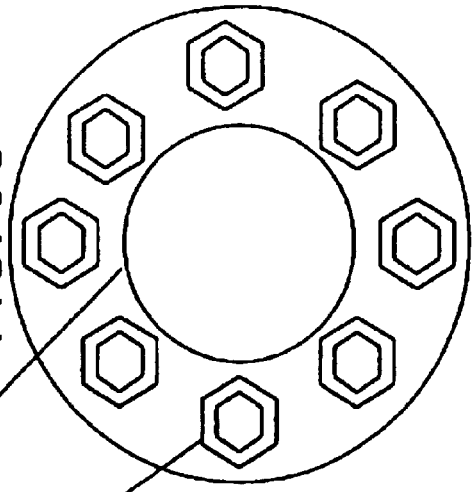
Figure 3A:
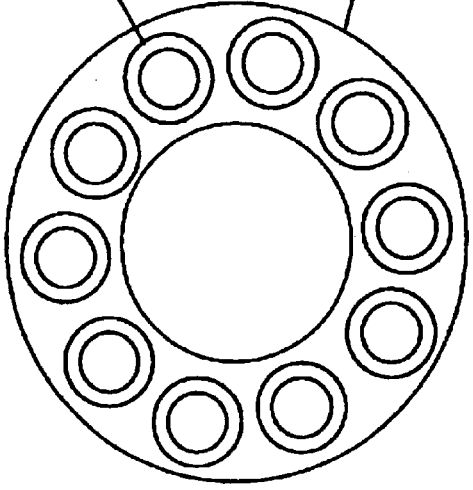
Figure 3B:
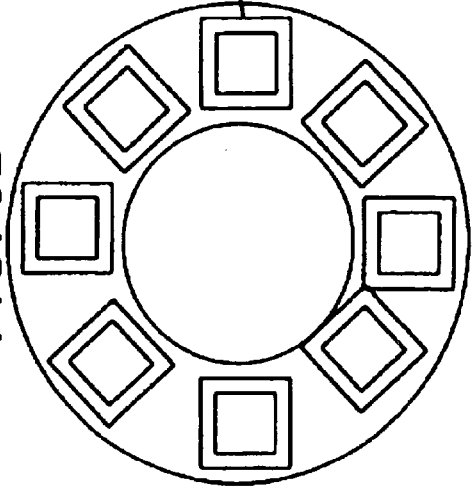

Turning briefly to FIGS. 3a–d, a set of exemplary configurations/geometries for the security tag are provided. As explained previously above, the security tag fits, by way of example, within the clamping area of a DVD or other optically readable data storage disc. The coils of the security tag can take any of a number of shapes and sizes—subject to the space limitations imposed by the disc geometry. FIGS. 3a, 3b and 3c schematically depict embodiments of miniature coil configurations. In these embodiments signal strength is enhanced by creating multiple replicated coil pairs and distributing the coils around the perimeter of a ring substrate for the security tag 202. FIG. 3d, on the other hand, derives signal strength through the use of large ring-shaped coils that conform to the ring-shape of the security tag 202's substrate. Alternative embodiments of the invention utilize other shapes/coil layouts.

Having described exemplary structural features of exemplary DVD structures embodying the present invention, attention is directed to the methods for fabricating such structures. Referring to the sequence of FIGS. 4a–b, 5a–b and 6a–b, the process for manufacturing DVD-14 and DVD-18 disc structures is summarized by way of identifying the layers at each of three primary stages. It is noted initially that a DVD-14 is two-readable-side DVD having a DVD-9 readable side and a DVD-5 readable side bonded together. A DVD-18 has two DVD-9 readable sides bonded together. The overall thickness of the DVD discs conforms to the 1.20 mm thickness specification.

Generally, in order to maintain the overall thickness specification of 1.20 mm. for a DVD, substrates used to fabricate the multiple readable layers are stripped and discarded so that the combined thickness is still 1.20 mm. To facilitate such stripping, an acrylic blank (that will release the aluminum without damaging the reflective layer) is used as the substrate for the reflective layer. The process starts with the manufacturing of a DVD 9 and a DVD 5 combination for DVD-14 or two DVD-9's for DVD-18. The information for the three readable layers for DVD-14 originates from three different stampers. Four stampers are used to produce the readable layers for DVD-18.

FIGS. 4a and 4b illustratively depict the initial molding/bonding processes. When a DVD-14 is manufactured, the half disc for the DVD-5 portion is molded. However, as shown in FIG. 4b, it is not necessary to bond a blank substrate to the DVD-5 disc because it will eventually be bonded to the DVD-9 substrate. The DVD-9 substrates are manufactured in the nearly same way as standard DVD-9's. However, the DVD-9 portion of the sandwich includes an acrylic layer for layer 1 instead of the standard polycarbonate used for DVD-9. Acrylic is used for the layer 1 substrate because it adheres poorly to aluminum.

The acrylic layer, which has the information molded into its surface from a stamper, can be pealed off the substrate during a stripping process, leaving the information embossed in the cured bonding lacquer layer with an aluminum surface. In principle, the acrylic substrate acts like a stamper as it is used to transfer the image of the pits into the cured bonding resin. The stripping process results in the layered structures described in FIGS. 5a and 5b. After the two DVD-9's in the case of DVD-18 are made or a DVD-9 and DVD-5 are made in the case of DVD 14, the DVD 9 portions go to the stripping process. The stripping process peals the acrylic substrates off the surface.

After stripping, the two disc halves are bonded together to yield a two-sided disc with four layers (two per side) for DVD-18 or a two-sided disc with three layers—two on one side and a single layer on the other—for DVD-14. A first step before the second bonding process comprises spin coating the exposed aluminum sides of the previously stripped disc halves with a CD-type UV protective coating. After the halves are protective coated (two DVD-9 disc halves for DVD-18 or one DVD-5 half and one DVD-9 half for DVD-14) the disc halves are bonded together. In accordance with an exemplary embodiment of the invention, the security tag 202 is applied to one of the two disc halves either during molding of a substrate or alternatively after sputtering and prior to re-bonding. In a particular illustrative embodiment, while an indexing carousel transfers a disc half containing the reflective metal layer to the final bonding stage, rotation of the table is temporarily paused and an applicator attaches (e.g., dispenses and tamps in place) the security tag 202 to the disc half prior to the application of the bonding resin and the final combination of the disc by a consolidator machine. After the bonding step a clamping mechanism ensures that the two substrates are securely attached to the tag and that the security tag 202 does not compromise the structural integrity of the secure disc 200.

Once the disc halves are bonded together the security tag 202 cannot be removed, yet the disc maintains all of the structural integrity of non-secure discs that do not include the security tag 202 embedded between the two substrates.

FIGS. 6a and 6b provide the final configuration for the DVD-18 and DVD-14 formats. The security tag 202 is contained in the second bonding layer.

Figure 7:
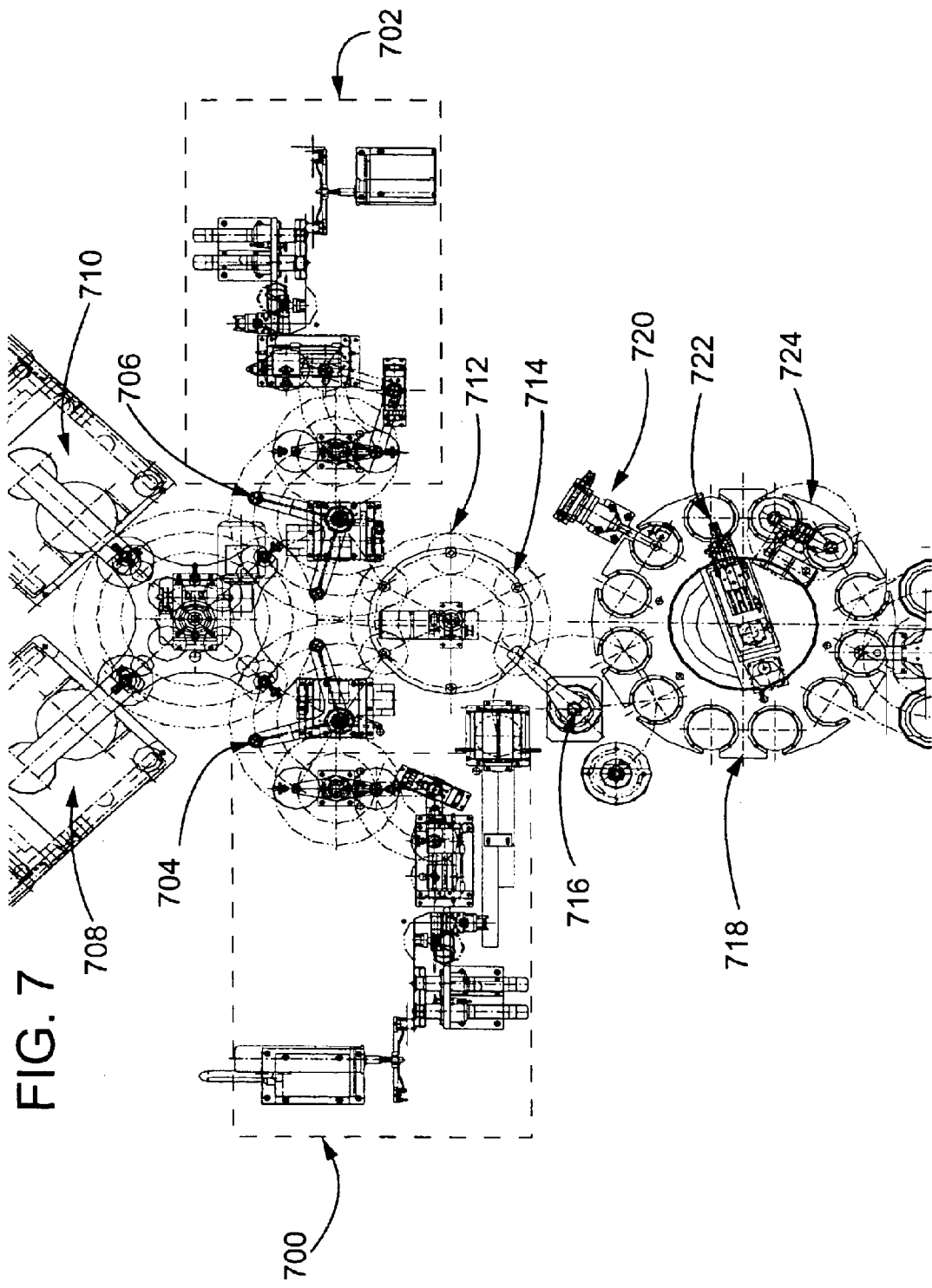
FIG. 7 is a plan view of an assembly line for carrying out DVD manufacturing in accordance with an embodiment of the present invention.

Turning to FIG. 7 a portion of a DVD assembly line is depicted. The illustrative set of machines manufactures either DVD-5 or DVD-9 (depending upon whether both sides are stamped/sputtered). Each substrate is initially produced by a molding/stamping sub-assembly 700 or 702 by Meiki Molding of Nagoya, Japan. Transfer arms 704 and 706 transfer the substrates to sputtering machines 708 and 710 made by UNAXIS of Luxembourg, if the substrate is a non-blank substrate. The sputtered or blank substrate is transferred by the transfer arms 704 and 706 to an indexing carousel 712. In an embodiment of the invention, while the substrate is laying, inside face up, on the indexing carousel 712 at position 714 (before applying a bonding resin and consolidating the two halves to form a single DVD, a tag applicator applies the security tag 202 to one of the two halves. Thereafter, the DVD halves are transferred by a transfer arm 716 to a consolidating assembly 718. A flipper 720 flips one of the two disc halves in preparation for consolidation while an applicator 722 applies bonding resin to the other half. Thereafter, a consolidator 724 mates the two halves of the disc to render a DVD-5 or DVD-9 disc. Thereafter, a spinner spins excess bonding resin from the consolidated disc assembly and the resin is cured through exposure to a UV light source. Inspection and printing stages complete the exemplary DVD assembly processes. The robotic transfer arms, indexing carousel 712 and components of the consolidating assembly 718 are provided, for example, by Origin of Tokyo, Japan.

Turning to FIGS. 8a and 8b, a set of schematic flow diagrams illustratively depict the primary stages for creating replicated DVD-5 and DVD-9 discs, respectively. These FIGS. schematically depict two alternative sequences of operations performed by the manufacturing line depicted in FIG. 7. With reference to FIG. 8a, a stamper line generates an embossed substrate at stage 800. Thereafter, the reflective (aluminum) coating is applied (sputtered) at stage 802 to render the data bearing half of the disc. At stage 804, while the disc half containing the reflective metal layer is being transferred to a bonding stage 806, wherein the data half is mated with a blank substrate provided by molding stage 807, the security tag 202 is applied to the "reflective" half. It is noted that in alternative embodiments of the invention, the security tag 202 is initially applied to the blank half after molding stage 807. It is further noted that in yet other embodiments, the tag 202 is embedded within either of the two substrate halves during either of the two injection molding stages 800 and 807. After the bonding stage 806, described in greater detail above with reference to FIG. 7, the disc is inspected at stage 808. Thereafter, printing is placed upon the blank side of the DVD during stage 810.

With reference to FIG. 8b, a stamper line generates an embossed substrate at stage 820. Thereafter, the reflective (aluminum) coating is applied (sputtered) at stage 822 to render one data bearing half of the DVD-9 disc. At stage 824, while the disc half containing the reflective metal layer is being transferred to a bonding stage 826, wherein the data half containing the reflective metal (Al) layer is mated with a second data half containing a semi-transmissive metal (Ag or Au) layer provided by stamper stage 827 and semi-transmissive layer stage 829, the security tag 202 is applied to the "reflective" half. It is noted that in alternative embodiments of the invention, the security tag 202 is initially applied to the "semi-transmissive" half after the semi-transmissive layer stage 829. However, for timing purposes, in an embodiment of the invention wherein one of the two sputtering processes takes longer than the other (e.g., the semi-transmissive layer takes longer to produce than the reflective layer), the security tag is applied to the half that takes less time to coat with a metal layer. It is further noted that in yet other embodiments, the tag 202 is embedded within either of the two substrate halves during either of the two injection molding stages 820 and 827. After the bonding stage 826, described in greater detail above with reference to FIG. 7, the DVD-9 disc is inspected at stage 828. Thereafter, printing is placed upon the blank, non-readable side of the DVD-9 disc during stage 830.

In view of the many possible embodiments to which the principles of this invention may be applied, it should be recognized that the embodiments described herein with respect to the drawing figures are meant to be illustrative only and should not be taken as limiting the scope of invention. Furthermore, the illustrative steps may be modified, supplemented and/or reordered (at least in part) without deviating from the invention. Therefore, the invention as described herein contemplates all such embodiments as may come within the scope of the following claims and equivalents thereof.

What is claimed is:

1. A secure optical data storage disc comprising:
   a first substrate;
   a second substrate; and
   a non-readable zone comprising a security tag, wherein the non-readable zone extends into a mirror band region, and a capacitive component of the security tag is located, at least in part within the mirror band region.

2. The secure disc of claim 1 wherein the security tag comprises a metal coil.

3. The secure disc of claim 2 wherein the metal coil is laid out as a set of rings.

4. The secure disc of claim 3 wherein the set of rings are concentric.

5. The secure disc of claim 2 wherein the metal coil is laid out as a set of non-concentric coils.

6. The secure disc of claim 2 wherein the metal coil comprises a set of non-circular coils.

7. The secure disc of claim 6 wherein the set of non-circular coils are non-concentric.

8. The secure disc of claim 2 wherein the security tag comprises a thin-film insulator sandwiched between metal coil pairs.

9. The secure disc of claim 1 wherein the secure disc comprises an information layer sandwiched between the first and second substrate, and wherein the security tag is also sandwiched between the first and second substrate.

10. The secure disc of claim 1 wherein the non-readable zone is substantially located within a clamping zone.

11. The secure disc of claim 1 wherein at least one of the first and second substrates has a non-uniform thickness to facilitate accommodating a thickness of the security tag that exceeds a bonding layer between the first and second substrates.

12. The secure disc of claim 1 wherein data carried on the disc comprises videogame console software.

13. The secure disc of claim 1 wherein data carried on the disc comprises a movie.

14. The secure disc of claim 1 wherein the security tag incorporates radio frequency identification technology.

15. The secure disc of claim 1 wherein the disc conforms to a DVD standard specification.

16. The secure disc of claim 1 wherein the secure disc comprises multiple data layers readable from a single side.

17. The secure disc of claim 1 wherein the secure disc comprises dual readable sides.

18. A method for manufacturing a secure optical data storage disc comprising a first substrate, a second substrate, and a non-readable zone that is not occupied by data tracks, the method comprising:

forming the first substrate and the second substrate;

securing a security tag to one of the first or second substrates within the non-readable zone; and bonding the first substrate and second substrate together such that the security tag is positioned between outer surfaces of the first and second substrates, wherein the forming and securing steps are performed during an injection molding stage wherein the security tag is placed within an injection mold for forming one of die first and second substrates prior to injecting a molten substrate material, and the forming step comprises forming the first substrate within a first mold and forming the second substrate within a second mold that differs from the first mold.

19. The method of claim 18 further comprising applying a semi-transmissive layer on the second substrate.

20. The method of claim 18 wherein the secure disc comprises multiple data layers readable from a single side.

21. The method of claim 18 wherein the secure disc comprises dual readable sides.

22. A method for manufacturing a secure optical data storage disc comprising a first substrate, a second substrate, and a non-readable zone that is not occupied by data tracks, the method comprising:

forming the first substrate and the second substrate;

applying a reflective layer to the first substrate;

applying a semi-transmissive layer to the second substrate;

securing a security tag to the first substrate within the non-readable zone; and bonding, after the securing step, the first substrate and second substrate together such that the security tag is positioned between the first and second substrates.

23. The method of claim 22 wherein the secure disc comprises dual readable sides.

24. A method for manufacturing a secure optical data storage disc comprising a first substrate, a second substrate, and a non-readable zone that is not occupied by data tracks, the method comprising:

forming the first substrate and the second substrate;

applying a reflective layer to the first substrate;

securing a security tag to the first substrate within the non-readable zone;

bonding, after the securing step, the first substrate and second substrate together such that the security tag is positioned between the first and second substrates; and transferring the first substrate to a carousel interposed between a sputtering station for performing the applying step and a consolidating station for performing the bonding step, wherein the placing the security tag upon the first substrate step is performed while the first substrate rests on the carousel.

25. The method of claim 24 wherein the secure disc comprises multiple data layers readable from a single side.

26. The method of claim 24 wherein the secure disc comprises dual readable sides.

* * * * *